(12) United States Patent
McKim et al.

(10) Patent No.: US 10,753,535 B2
(45) Date of Patent: Aug. 25, 2020

(54) LUBRICATION MANIFOLD

(71) Applicant: GJR Meyer Service, Inc., Corpus Christi, TX (US)

(72) Inventors: Noel McKim, Corpus Christi, TX (US); Randy Scott Meyer, Alice, TX (US)

(73) Assignee: GJR Meyer Service, Inc., Corpus Christi, TX (US)

( * ) Notice: Subject to any disclaimer, the term of this patent is extended or adjusted under 35 U.S.C. 154(b) by 282 days.

(21) Appl. No.: 15/466,694

(22) Filed: Mar. 22, 2017

(65) Prior Publication Data

US 2017/0276293 A1  Sep. 28, 2017

Related U.S. Application Data

(60) Provisional application No. 62/311,879, filed on Mar. 22, 2016.

(51) Int. Cl.
*F16N 13/22* (2006.01)
*F16N 7/38* (2006.01)
(Continued)

(52) U.S. Cl.
CPC ............. *F16N 13/22* (2013.01); *E21B 34/02* (2013.01); *F16N 7/385* (2013.01); *F16N 21/00* (2013.01); *F16N 25/00* (2013.01); *F16N 29/02* (2013.01); *E21B 41/00* (2013.01); *E21B 43/26* (2013.01); *F16N 2270/30* (2013.01)

(58) Field of Classification Search
CPC .......... F16N 13/22; F16N 7/385; F16N 21/00; F16N 25/00; F16N 29/02; E21B 34/02
See application file for complete search history.

(56) References Cited

U.S. PATENT DOCUMENTS 4,679,659 A * 7/1987 Jendick ................... F16N 13/22
                                                        184/15.2
8,220,553 B2 * 7/2012 Crawford .............. E21B 33/072
                                                        166/241.5
(Continued)

*Primary Examiner* — Michael A Riegelman
(74) *Attorney, Agent, or Firm* — The Kubiak Law Firm PLLC

(57) ABSTRACT

The current invention includes manifold having multiple outputs and at least one input for lubricant to be pumped at high pressure from a skid or trailer to a particular frac valve when the valve requires lubrication. Generally, such frac valves require lubrication on an hourly schedule or less. Each output port on the manifold is fitted with an on/off valve that allows remote operation such as pneumatic, hydraulic, electro-pneumatic operation, or other known remote operation system. The pump or pumps are also configured for remote operation. A controller is then provided so that each circuit allows, upon command, lubricant to be pumped from the lubricant reservoir, through the pump, to the manifold, through each remotely operable valve, via each output port, through an appropriate rated hose, then to the lubrication or other port on each frac valve. Generally, once connected each frac valve remains connected to the system to allow the operator to cause lubricant to flow to each valve upon command. The controller may also provide a safety cutout so that the system will only provide pressurized lubricant with the controller in the operator's possession while the operator continuously actuates the appropriate switch.

4 Claims, 2 Drawing Sheets

(51) Int. Cl.
  *F16N 25/00* (2006.01)
  *F16N 29/02* (2006.01)
  *E21B 34/02* (2006.01)
  *F16N 21/00* (2006.01)
  *E21B 41/00* (2006.01)
  *E21B 43/26* (2006.01)

(56) References Cited

U.S. PATENT DOCUMENTS

| | | | |
|---|---|---|---|
| 9,315,372 B2 * | 4/2016 | Doi | F16N 7/385 |
| 2010/0219020 A1 * | 9/2010 | Knox | B65G 45/02 |
| | | | 184/7.4 |
| 2011/0030963 A1 * | 2/2011 | Demong | E21B 43/26 |
| | | | 166/313 |
| 2012/0247876 A1 * | 10/2012 | Kreutzkamper | F16N 7/385 |
| | | | 184/26 |
| 2013/0175039 A1 * | 7/2013 | Guidry | E21B 33/03 |
| | | | 166/308.1 |
| 2014/0048255 A1 * | 2/2014 | Baca | E21B 33/068 |
| | | | 166/250.1 |
| 2015/0176762 A1 * | 6/2015 | Conley | F16N 29/02 |
| | | | 417/43 |
| 2015/0345272 A1 * | 12/2015 | Kajaria | E21B 41/0092 |
| | | | 166/250.01 |
| 2017/0114957 A1 * | 4/2017 | Conley | F16N 29/02 |
| 2017/0146189 A1 * | 5/2017 | Herman | F16N 13/22 |
| 2017/0276293 A1 * | 9/2017 | McKim | E21B 34/02 |
| 2018/0163501 A1 * | 6/2018 | Guidry | E21B 33/062 |
| 2018/0223984 A1 * | 8/2018 | Dziuba | F01M 1/16 |

* cited by examiner

LUBRICATION MANIFOLD

CROSS-REFERENCE TO RELATED APPLICATIONS

This application claims priority to U.S. Provisional Patent Application No. 62/311,879 that was filed on Mar. 22, 2016.

BACKGROUND

There are problems when increasing the number of valves used on frac locations. The valves are going to be either zipper or manifold valves etc. In any event these are the surface valves that control where the fluid is flowing on the surface as opposed to the downhole valves. They could be high-pressure gate valves involved in the fracking process or they might be a blowout preventer stack involved in well control.

One of the issues in a frac type application is most if not all of the surface valves, such as those described above, have to be greased fairly frequently, in some instances on an hourly basis. Currently the operator has to move the grease/lubricant connection hoses from valve to valve by hand. Requiring personnel to disconnect each hose from its fining, unscrew it etc. and then connect each hose to something else such as another fitting etc. In many instances the valves are pressurized to much as 20,000 psi such that if a check valve fails there is a safety issue. The safety issue stems from the operating parameter, where in order to inject lubricant into the valve, the pressure in the wellhead manifold must be overcome which means that the pressure of the lubricant in many instances is 15,000 to 20,000 psi to overcome the pressure inside the valve, typically wellhead pressure. The valves are also usually in an elevated situation which means that the person disconnecting the hoses by hand must climb upon a ladder or other means in order to reconnect each hose to another valve. In other instances, the valves may be difficult to reach even when not elevated. The valves may be oil-soaked or dripping causing unsafe footing and other hazards. The valves are typically near the wellhead which means that the operator may be an environment for hydrogen sulfide gas is present or where explosive gases are present.

In order to safely disconnect the hose, the pressure at the fitting must be relieved. Therefore, the pressure in the manifold must be relieved by halting the pumps, isolating the fitting from the wellbore pressure, and bleeding off the pressure that is in the tubular. Typically, the fittings used have a built-in check valve that allows many operators to forgo the step of bleeding off the pressure in the tubular prior to disconnecting and reconnecting the fittings. However, should the check valve fail, the person disconnecting the fitting may be injured due to the high pressure in the line.

With the popularity of multiple stacks growing there may be eight or more wellheads on a common location all of which are being fraced via the same manifold. In such instances the operator may have in excess of 40 valves thereby increasing the chance that the wrong fitting has been disconnected and or the wrong fitting has been reconnected. Additionally, because the valves have to be lubricated frequently the time to disconnect and then reconnect each line and fitting and then lubricate each valve tends to become excessive. In many instances the time required to lubricate the valves exceeds 50% of the time it takes to frac a well. In other words, disconnecting and reconnecting lines and fittings to appropriately lubricate the valves presents a problem where the operator a) has to connect the right unit at the right time, b) shut down the correct portions of plumbing at the right time, c) safety issues to the personnel performing the operations, and d) due to the location issues, noise issues, etc. the operator may have difficulty determining exactly how much lubricant is actually pumped into a particular valve. The result is that in many instances the valves may be under greased or over greased.

An issue in lubricating the frac valves is determining how much lubricant is pumped into a particular valve. Usually the pump and lubricant are over 100 feet away from the wellhead where the valves are located in order to isolate the pumps and lubricants from the potential explosive and hydrogen sulfide issues at the wellhead. Such long distances also significantly increase the time it takes to lubricate each frac valve as the operator has to shut down the correct portion of the valving (or rely on the check valves), walk at least 100 feet to the valve manifold, place the ladder in the correct position, get on the ladder in a hazardous environment in order to disconnect a fitting that is potentially subject to 15,000 psi pressure, reconnect the fitting to the desired valve, get down off the ladder, walk back over to the pump and lubricant that to the pump and lubricant, turn the pump on, then either wait a predetermined period of time, a certain number of pump strokes, or until the pump reaches a certain amount of pressure, turn the pump off, and repeat for the next valve and repeat up to 40 times per hour of operation.

In many instances two people will work together to lubricate the valves with one person at the wellhead disconnecting and reconnecting the fittings while the other person remains with the pump and lubricant to turn the pump on and off. Unfortunately, in many instances with the noise from fluid flowing through the various tubulars and the frac pumps that even with radios it is difficult to communicate one person to another.

The problem with under-lubricating a valve is that you cut down on the life expectancy of that valve. On the other hand, when you over-lubricate a valve expensive lubricant is wasted. Such lubricant may cost several thousand dollars per barrel. Additionally, in many instances the lubricant may interfere with the operation of certain tools in the wellbore such as fishing tools.

SUMMARY

Typically, the pumps that force the lubricant into the wellhead valves tend to be diaphragm or piston operated pumps that use pneumatic pressure at anywhere from 100 to 200 psi to create an output pressure for the lubricant that may be 100 to 200 times higher than the pneumatic pressure. In other words, the lubricant pump input pressure may be 200 psi of air pressure while the output pressure may be 20,000 psi hydraulic pressure upon the lubricant. Typically, a diesel-powered air pump is mounted on the skid in close proximity to the lubricant pump. The lubricant pump is mounted to a 55 gallon drum of lubricant with the drum affixed, such as bolted or clamped, to the skid. The output of the lubricant pump is connected to a hose capable of handling the hydraulic pressure and of sufficient length to reach the lubrication manifold. Where the lubrication manifold is attached to at least one on/off valve.

Preferably the lubrication manifold has a single input from the lubricant pump (although multiple inputs may be used in the event that a second or more lubricant pumps are used to provide either additional volume or as a backup in the event the first pump fails) the manifold then has at least one, but preferably multiple, output ports where each port is connected to an on-off valve which in turn is continuously connected to the frac valve that requires lubrication. Each on-off valve is independently operable so that all of the valves may be off and then a single valve activated to allow fluid flow through that valve (or provided that there is sufficient volume at the desired pressure) multiple valves may be opened.

Each valve in turn is connected to a particular fitting on the wellhead manifold for each filling provides lubrication to a particular wellhead manifold valve so that when the desired wellhead manifold valve requires lubrication the corresponding on off valve is activated to turn the on/off valve to the on position thereby allowing lubricant to be pumped out of the 55 gallon drum through the high-pressure pump through the hose connecting the pump to the lubrication manifold through the port corresponding to the now on on/off valve through a hose of sufficient length to reach the wellhead manifold and in through the particular fitting that corresponds to the particular wellhead manifold valve. Because no fittings have to be disconnected and reconnected in order to lubricate a valve and the diaphragm pump is providing lubricant at a sufficient pressure lubricating each valve may take place without ceasing operations through the wellhead manifold.

Generally, the system includes a pump, where the pump provides fluid at 10,000 psi or greater, and where the pump is remotely operable. The system also includes a manifold having an input port, at least a first output port and a second output port. The pump is in fluid communication with the input port. A remotely operable first valve is in fluid communication with the first output port and a first frac valve and a remotely operable second valve is in fluid communication with the second output port and a second frac valve.

The lubrication system also includes a controller that incorporates activation and deactivation circuits to control the remotely operable pump as well as any of the valves including the remotely operable first valve or remotely operable second valve. The controller is capable of activating any combination of the remotely operable pump or pumps and remotely operable valves either independently or in combination. In some instance the controller may include a master switch so that none of the circuits may operate without a pump being activated. Additionally, the controller may include a safety cutout that prevents the pumps from being activated and/or any of the remotely operated valves from being switched to the open position unless the operator is holding the cutout switch in the on condition, or off depending upon the circuitry. Such a switch prevents an operator from inadvertently disconnecting a pressurized line. In many instances the controller is linked to the pump, the remotely operable first valve, and the remotely operable second valve by radio. Additionally, the pump, the remotely operable first valve, and the remotely operable second valve may be pneumatically or hydraulically operated. Finally, the system is generally sized to allow the pump, a requisite number of remotely operable valves, and a lubricant reservoir to be mounted on a single skid.

Generally, to us the lubrication system the operator should connect a remotely operable pump to a manifold, where the manifold has at least one input port, a first output port, and a second output port. The first output port is connected to a first remotely operable valve and the second output port is connected to a second remotely operable valve. Other remotely operable valves, if utilized, may be connected in a similar manner. The first remotely operable valve is connected to the first frac valve and the second remotely operable valve is connected to the second frac valve. The operator then holds on the cutout, if provided, after which the master switch on the controller is activated, the controller is then used to remotely actuate the remotely operable pump, and to remotely operate the first remotely operable valve, the second remotely operable valve, or additional remotely operable valves if utilized. The controller may actuate or deactuate the remotely operable valves independently or in any combination desired.

DETAILED DESCRIPTION

Figure 1:
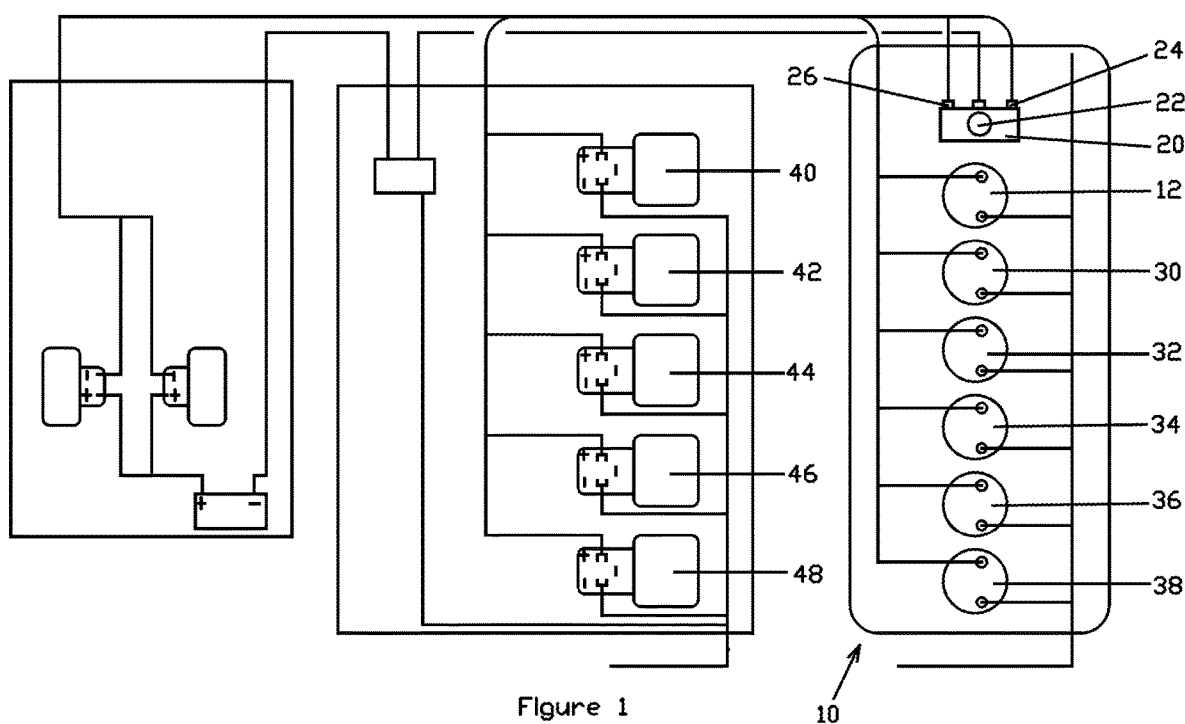
FIG. 1 is a schematic diagram of the control pendant 10.

FIG. 1 is a schematic diagram of the control pendant 10. The control pendant 10 has at least three features. A pump module 20, a master hold down switch 12, and lubricant actuation valve switches 30, 32, 34, 36, and 38. In this instance only five lubricant actuation valve switches are shown. More or less lubricant actuation valve switches may be utilized as desired.

The pump module 20 controls the lubricant pump and as shown is configured for the first pump switch 24 and a second pump switch 26, although a single pump is typically used. In this case the second pump is a backup pump in case the first pump fails or if the pump being used should run out of grease or lubricant.

To actuate the system and pump lubricant into a valve at the wellhead the pump module toggle 22 is set to the left pump 24 or to the right pump 26 to close or actuate this particular portion of the circuit which in turn provides power to the pumps providing pressure to the system. The master hold down switch 12 is generally closed, typically depressed, in order to actuate any of the pumps or circuits. Finally, any of the lubricant actuation valve switches 32, 30, 34, 36, or 38 must be closed in order to energize the circuit thereby energizing the corresponding solenoid and opening the corresponding valve. For instance, provided the rest of the circuit is activated, when lubricant actuation valve switch 34 is closed the circuit is energized to actuate solenoid 44. When solenoid 44 is actuated the associated lubricant valve opens allowing lubricant to flow from the lubricant pump into the wellhead to the particular frac valve where lubricant is required. While an electrical actuation system has been described, other actuation systems may be utilized such as hydraulic, mechanical, pneumatic, radio, optical, or any other actuation system known in the industry.

Figure 2:
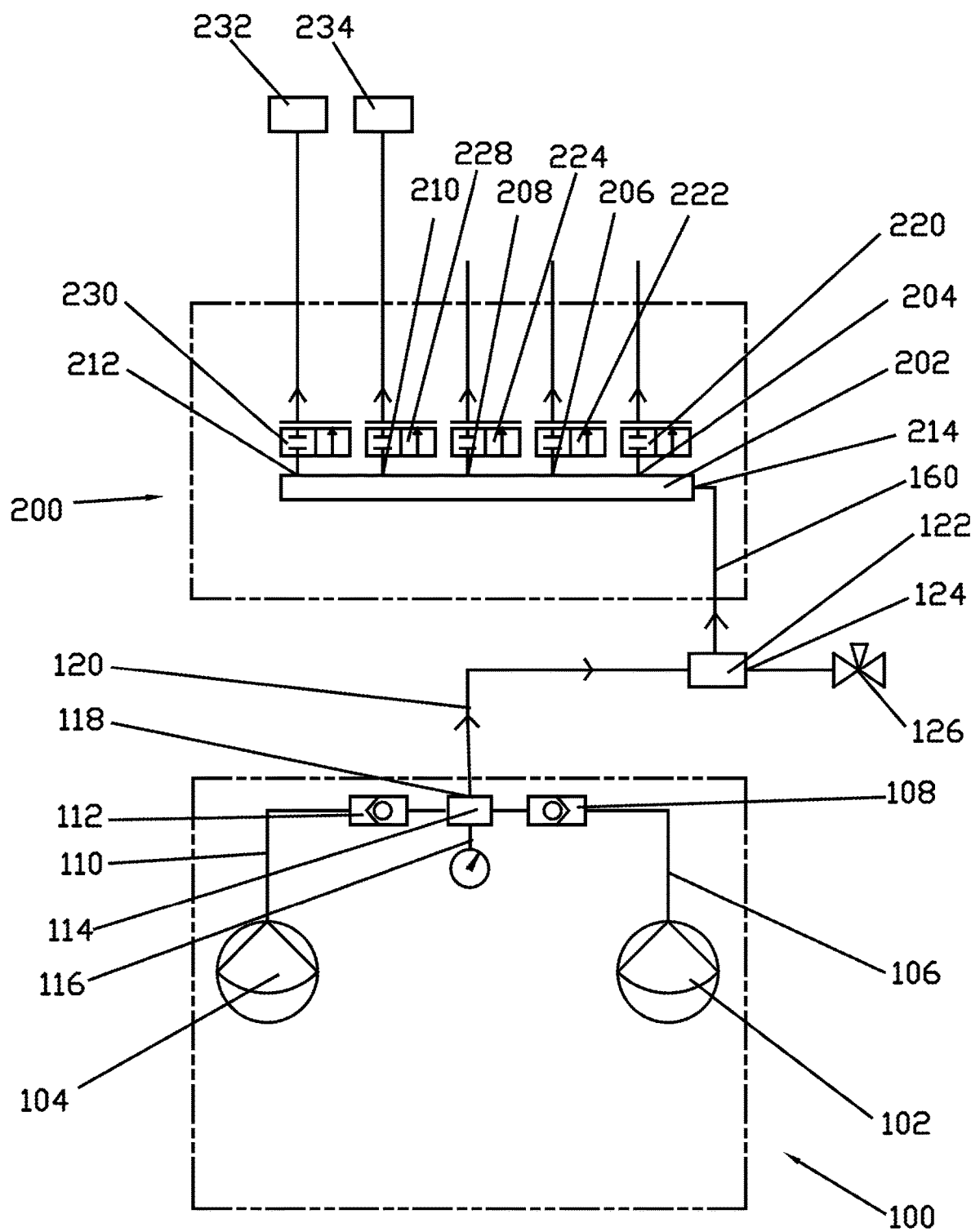
FIG. 2 is a schematic of the pump system depicting the pump side and the lubricant manifold side.

The pump system depicted in FIG. 2 has a pump side 100 and a lubricant manifold side 200. The pump side shows a first pump 102 and a second pump 104. Preferably each pump is pneumatically operated having an approximately 100 psi air pressure input that drives the pump to supply lubricant at approximately 15,000 psi. The output pressure of the pneumatic pump depends upon the input air pressure and area of the pneumatic piston as compared to the area of the output piston typically pneumatic pumps provide output pressure at between 10,000 psi and 20,000 psi, although this case the optimal pressure is 15,000 psi. The output of the first pump 102 flows through line 106 into check valve 108 while the output of the second pump 104 flows through line 110 to check valve 112. Each of the check valves 108 and 112 allow lubricant to flow out of its respective pump but does not allow lubricant or other fluid to flow back towards the pump. As the fluid flows out of either pump 102 or 104 it flows into a junction in this case a four-way junction 114. In addition to the output from check valve 108 and 112 the four-way junction 114 has a port for a pressure gauge 116 and the output port 118. The output port 118 flows into line 120 and is connected to a three way valve 122. The three way valve 122 has input from line 120 and has a port 124 connected to a valve 126. The valve 126 can be used to bleed pressure from the system, to connect via a hose (not shown) directly to the wellhead valve that needs to be lubricated, or may connect to another set of lubricant pumps. Additionally, the three way valve 122 has an output line 160. The output line 160 is connected to the lubricant manifold 202. The lubricant manifold has a number of ports such as port 204, 206, 208, 210, 212, and 214. In this instance for 214 is an input port and is connected to line 160 from the three way valve 122 and provides lubricant to an internal cavity within lubricant manifold 202. The lubricant then flows into the internal cavity within lubricant manifold 202. Each of the ports 204, 206, 208, 210, and 212 is an output port and is in fluid communication with the internal cavity within lubricant manifold 202. While in this instance five ports are shown more ports or fewer ports may be provided as required. Each output port 204, 206, 208, 210, and 212 is connected to a valve that controls lubricant flow from the lubricant manifold 202 through the particular port and into the wellhead valve needing lubrication. In this instance each of the valves such as valves 220, 222, is an electromechanical valve such as a solenoid actuated as previously described to open a fluid path allowing fluid to flow from the lubricant manifold 202 and into the wellhead or frac valve needing lubrication.

Preferably the entire system including the air supply, the lubricant pump, and the lubrication manifold are mounted on a single transportable skid, trailer or other mobile mounting system.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A lubrication system comprising:
a pump,
wherein the pump provides fluid at 10,000 psi or greater,
further wherein the pump is remotely operable,
a manifold having an input port, a first output port, and a second output port,
wherein the pump is in fluid communication with the input port,
a remotely operable first valve in fluid communication with the first output port and a continuously connected first frac valve,
a remotely operable second valve in fluid communication with the second output port and a continuously connected second frac valve,
at least two check valves in fluid communication with the manifold, and
a pressure gauge disposed in fluid communication between the at least two check valves and the continuously connected first and second frac valves.

2. The lubrication system of claim 1 further comprising a control pendant wherein the controller activates or deactivates the pump, the remotely operable first valve, and the remotely operable second valve.

3. The lubrication system of claim 2 wherein, the control pendant allows each of the remotely operable first valve and the remotely operable second valve to operate independently.

4. The lubrication system of claim 2 wherein, the control pendant allows activation of the remotely operable first valve and the remotely operable second valve only when the pump is activated.

* * * * *